United States Patent [19]

Doyel

[11] 4,114,781
[45] Sep. 19, 1978

[54] HAND-HELD, BATTERY-OPERATED DECORATIVE EXTRUDER FOR COOKIE DOUGH AND SIMILAR FOOD SUBSTANCES

[76] Inventor: John S. Doyel, 404 W. 20th St., New York, N.Y. 10011

[21] Appl. No.: 803,856

[22] Filed: Jun. 6, 1977

[51] Int. Cl.² .............................................. B67D 5/46
[52] U.S. Cl. ..................................... 222/326; 222/333
[58] Field of Search ............... 222/326, 327, 333, 390; 128/218 A, 236, 237, 238; 99/353

[56] References Cited

U.S. PATENT DOCUMENTS

| Re. 26,180 | 4/1967 | Frenzel et al. | 222/390 X |
|---|---|---|---|
| 1,391,325 | 9/1921 | Killian | 222/390 |
| 3,162,337 | 12/1964 | Sabaka | 222/327 |
| 3,984,033 | 10/1976 | Groth et al. | 222/333 |
| 3,997,115 | 12/1976 | Licudine | 222/333 X |
| 4,030,665 | 6/1977 | Koyama | 222/333 X |

Primary Examiner—Stanley H. Tollberg
Assistant Examiner—Fred A. Silverberg
Attorney, Agent, or Firm—Cooper, Dunham, Clark, Griffin & Moran

[57] ABSTRACT

A simple and inexpensive, hand-held, battery-operated device extrudes dough or another paste- or cream-like food substance to make cookies and the like or food decorations. The substance is in a tube and is pushed out by a nonrotating pusher moved along the tube by a nonrotating drive screw driven along the tube by a battery-powered, rotating gear wheel.

2 Claims, 3 Drawing Figures

HAND-HELD, BATTERY-OPERATED DECORATIVE EXTRUDER FOR COOKIE DOUGH AND SIMILAR FOOD SUBSTANCES

SUMMARY AND BACKGROUND OF THE INVENTION

There are numerous hand devices for extruding paste- or cream-like food substances, such as the common "bakers sleeve" or the plunger devices of the type shown in U.S. Pat. No. 1,996,628. There are hand-operated devices using a rotating drive screw in a piston to push a similar substance out of an extruding sleeve, such as the one shown in U.S. Pat. No. 2,420,616. There are devices, such as the one shown in U.S. Pat. No. 3,984,033, which use an electric motor connected to a household electrical outlet to rotate a drive screw in one direction, to move a nonrotating piston along an extruding sleeve so as to push out the substance to be extruded, and in an opposite direction to return the piston to its home position. And, there are devices such as those shown in U.S. Pat. Nos. 1,466,509 and RE 26,180, which use a nonrotating drive screw driven forwardly, along an extruding sleeve, to push the substance to be extruded out by a piston, or backwardly, to bring the piston back to its home position. The nonrotating drive screw is driven along the sleeve axis by a rotating gear wheel having an internal thread meshing with the external thread of the drive screw. While it is desirable to have powered extruding devices, such as those shown in the three last cited patents, particularly in the case of substances such as dough which requires substantial pressure for adequate extrusion, and it is desirable that such devices be portable, for home use, such as the devices shown in U.S. Pat. Nos. 3,984,033 and RE 26,180, it is also desirable that such portable devices be convenient to use and be simple and inexpensive so that they can find widespread use in the home. It is also desirable that such powered device be safe to the user and that they not expose the user to electrical shock even when used impoperly. It is also desirable that such devices be easily disassembled for cleaning and again assembled for using, and that they be simple to operate. It is believed that none of the known devices of this kind meets all of these desirable goals, and this invention is directed to providing a different device of this type which better meets these goals.

A device embodying the invention is battery-operated, so as to completely avoid the possibility of dangerous electrical shock to a user, it is simply and inexpensively made, primarily of molded plastic components, so as to be inexpensive, and is simple to operate and to disassemble for cleaning and again assemble for use. More specifically, a device embodying the invention includes a plastic tube and a plastic pusher which fits closly within the tube but can move along the tube axis. The tube and the pusher have cooperating means for preventing relative rotation between the two about the tube axis. For example, the tube is generally cylindrical but has two flattened sides and the pusher is similarly shaped. The back end of the tube is detachably secured to a housing molded of plastic mateial, e.g., by screwing the back end of the tube into the housing. The housing includes a rotatable gear wheel having a central, internally threaded opening coaxial with the tube axis. A drive screw extends through this internally threaded opening of the gear wheel and through suitable openings in the housing, and the back end of the tube is secured detachably to the pusher such that it cannot rotate with respect to it; for example, the pusher has at its back side a square opening which receives a square front end of the drive screw. The drive screw has a back portion which is externally threaded, to mesh with the internal thread of the gear wheel, and a reduced diameter front portion which passes through the threaded opening of the gear wheel without engaging the thread. The housing also contains an electrical motor for rotating the gear wheel about the tube axis through a suitable power transmission device, such as a gearing connecting the motor shaft to the gear wheel. The motor is connected to batteries through a suitable electrical switch.

In typical operation, the tube is attached to the housing, the pusher is moved all the way back in the tube to its home position and the tube is filled with the food substance to be extruded. A selected extruding disc or an extruding tip is placed at the open front end of the tube and secured in place by screwing on a tube cap. The drive screw is put in place from the back of the housing by moving its reduced diameter front end through the internally threaded opening of the gear wheel until the threads of the drive screw and the gear wheel engage. At that time the motor is turned on while holding the drive screw to keep it from rotating. The drive screw is moved forwardly along the tube axis by the motor so that its reduced diameter front end can engage nonrotatably with the pusher. At this time there is no longer a need to hold the drive screw to keep it from rotating, and continuing operation of the motor drives the drive screw forwardly and thus moves the pusher forwardly to extrude the substance through the extruding disc or tip. The threaded portion of the drive screw runs out of the drive wheel just before the pusher reaches the end of the tube. To refill or clean the extruder, the tube is unscrewed from the housing and the drive screw, which has run forwardly out of the gear wheel, is removed from the back of the tube. The tube cap and the extruding disc or tip is removed from the front end of the tube and the pusher is pushed back to its home position and the tube refilled. For cleaning, the pusher is pushed forwardly out of the tube.

The drive screw never enters the substance being extruded, and this keeps the drive screw threads and the gear wheel driving it along the tube axis clean and at a low coefficient of friction as compared with, for example, the device of U.S. Pat. No. 3,984,033, cited above, where the drive screw extends into the substance being extruded and that substance can foul the meshing threads of the drive screw and piston. Moreover, the thread of the drive screw on this invention is interrupted by cutouts extending along the length of the drive screw, which cutouts do not interfere with the smooth operation of the invented device but reduce substantially the cross-sectional area and thickness of the drive screw and thereby reduce the time it takes to mold the drive screw of a thermoplastic material and the amount of material needed. It is noted that such cutouts are possible in the arrangement of this invention, where the drive screw does not enter the substance being extruded, but would not be possible in an arrangement such as in U.S. Pat. No. 3,984,033, cited above, because the substance being extruded would back-leak through the space between the cutouts and the internally threaded central opening of the piston.

DETAILED DESCRIPTION

Figure 2:
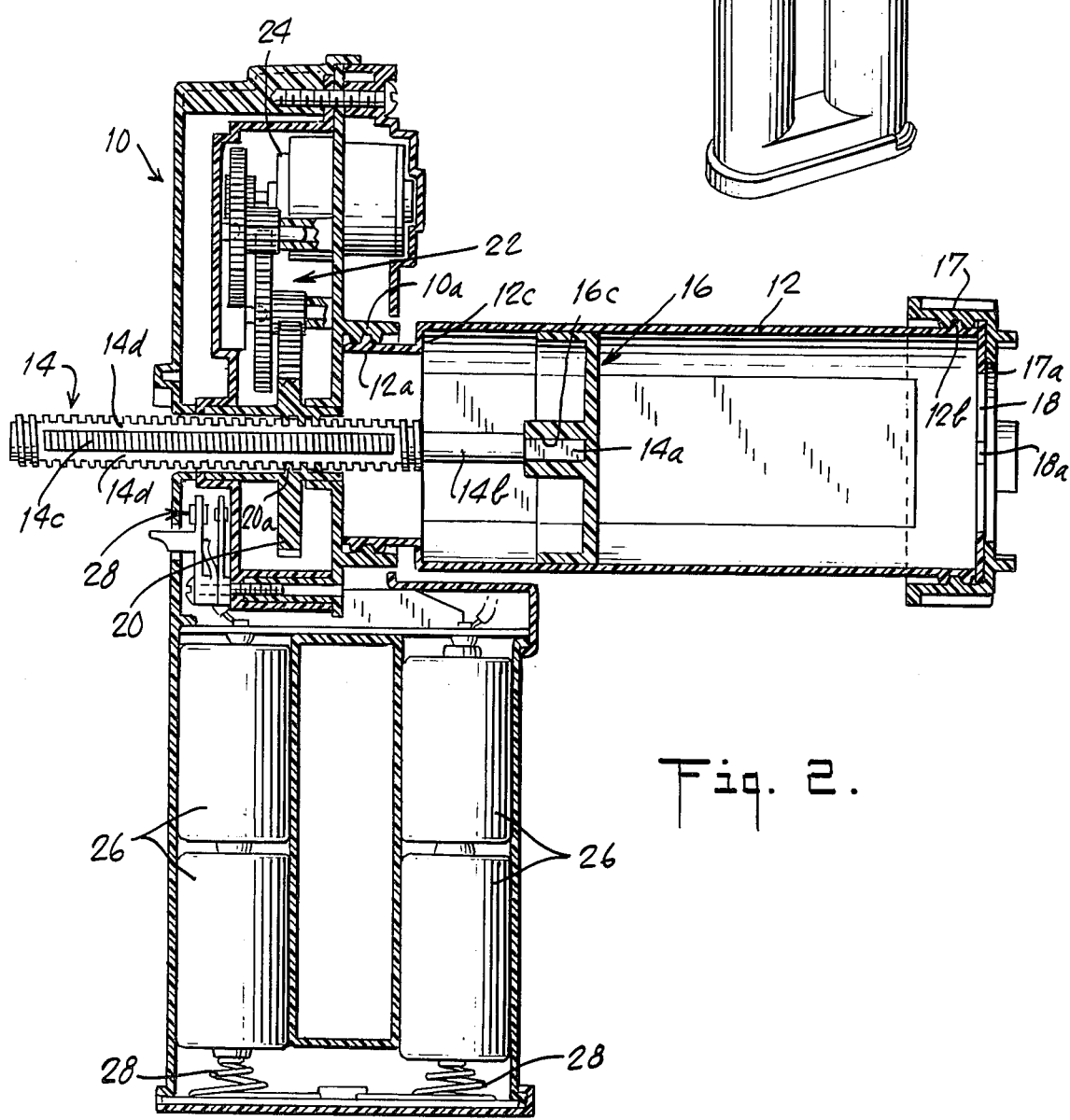
FIG. 2 is a vertical cross-sectional view of the extruder shown in FIG. 1.
Figure 3:
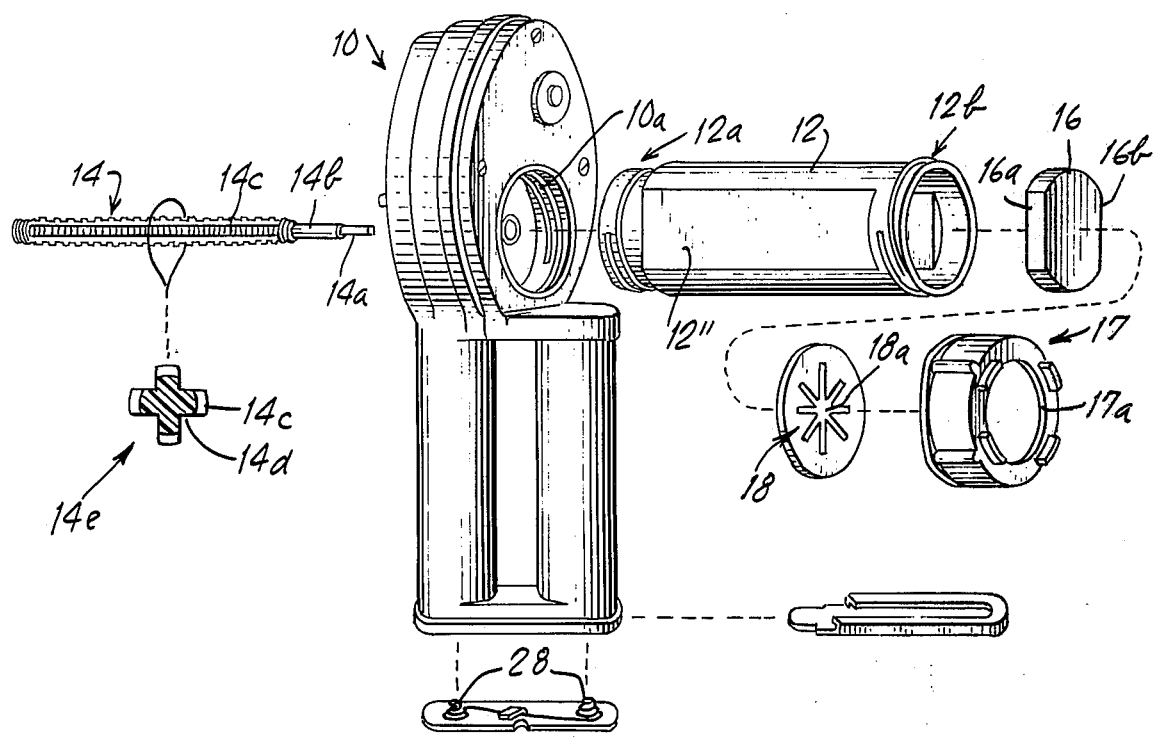
FIG. 3 is an exploded view of the major components of the extruder.

The illustrated extruder comprises a housing generally indicated at 10, a sleeve 12 and a drive screw 14. A pusher 16 fits tightly in the tube 12 but can move back and forth along the tube axis. The tube 12 is generally cylindrical but has two flattened sides 12' and 12", and the pusher 16 similarly has two flattened sides 16a and 16b (FIG. 3) matching the flattened sides of the tube 12 so as to prevent relative rotation between the tube and the pusher about the tube axis while maintaining close fit and thereby a good seal between the internal wall of the tube and the circumference of the pusher. The tube 12 is detachably secured to the housing 10 by screwing the externally threaded back portion 12a of the tube into a matching internal thread at 10a of the housing. The tube 12 has an externally threaded front portion 12b, and an internally threaded cap 17 can be screwed over the front end of the tube 12 to hold an extruding disc 18 in place at the front end of the tube. The extruding disc 18 has a central aperture 18a through which a food substance can be extruded out of the tube 12. In fact, a number of extruding discs with different apertures may be provided with the extruder so the user can select a particular one for a particular application. Extruding tips or cones, not shown, may be used in place of the extruding disc 18. The tube cap 17 has a front opening 17a through which the extruded substance can pass freely. The pusher 16 can travel forwardly in the tube 12 to the extruding disc 18 and can travel back to a home position against a flange 12c (FIG. 2). The pusher 16 has at its back side a square opening 16c into which a square front end 14a of the drive screw 14 can fit so as to prevent relative rotation between the pusher 16 and the drive screw 14. The square front 14a and another portion 14b of the drive screw 14 form a reduced diameter front portion of the drive screw, and back of this reduced diameter front portion there is an externally threaded back portion 14c. The thread extends all the way back along the drive screw, but if desired there can be another reduced diameter portion back of the threaded portion 14c. It is important, however, that no part of the drive screw have a greater diameter than the inner diameter of the thread, so the entire drive screw can pass through the internally threaded center opening 20a of a gear wheel 20. The gear wheel 20 is coaxial with the tube 12, and its internal thread 20a meshes with the external thread of the drive screw 14. The drive wheel 20 is suitably mounted in the housing pin for rotation about the tube axis, and is driven by such rotation through a gear train generally indicated at 22 and comprising a conventional reduction gear meshing with external gearing of the gear wheel 20 and being driven by an electric motor 24. The motor is supplied with electricity from batteries 26 mounted in the lower, handle portion of the housing 10 and connected electrically to the motor 24 through a manual switch generally indicated at 28. The motor is unidirectional and when energized rotates the gear wheel 20 so as to drive the non-rotating drive screw 14 forwardly, toward the extruding disc 18.

The drive screw 14 has four cutouts 14d which are uniformly spaced around its circumference and extend along nearly the entire length of the threaded portion 14c. Because of these cutouts 14d, the drive screw 14 is cross-shaped in transverse section, as seen at 14e in FIG. 3. These cutouts substantially reduce the cross-sectional area and thickness of the drive screw, as compared with a drive screw without such cutouts, and therefor substantially reduces the time for thermoplastic molding the drive screw, which time is a function of this area and thickness. This, of course, is also a substantial reduction in the amount of material needed, which is consistent with the goal of making the device described here.

Figure 1:
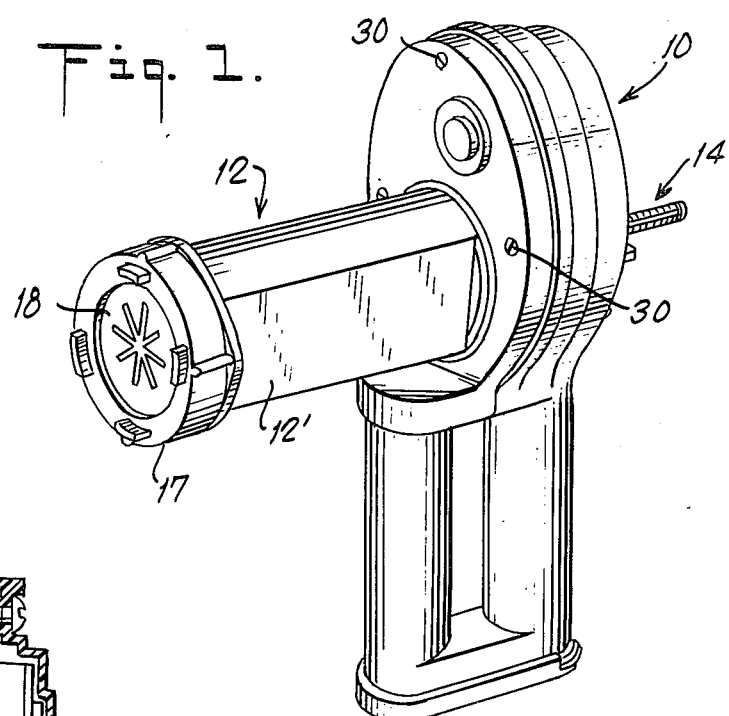
FIG. 1 is a perspective view of an extruder embodying the invention.

In typical operation, the tube 12 is screwed into the housing 10 to assume the position shown in FIGS. 1 and 2 but its front end is left free of the extruding disc 18 and the cap 17. The pusher 16 is loaded into the tube 12 from its front end and pushed back along the tube until it comes to a home position resting against the flange 12c shown in FIG. 2. A suitable implement (not shown) may be used to help move the pusher 16 back along the tube. The tube is then filled with the food substance to be extruded, which may be dough or another paste- or cream-like substance, and the loaded food substance is packed, again using a suitable packing implement. The extruding disc 18, or a similar extruding disc, tip or cone, is placed over the open front end of the tube 12 and is held in place by screwing the cap 17 over the front end of the tube 12. The drive screw 14 is at this time separate from the extruder. It is loaded in place by pushing its reduced diameter front portions 14a and 14b through the threaded central opening of the gear wheel 20 until the front end of the threaded portion 14c comes to bear against the threads 20a of the gear wheel 20. At this time the switch 28 is closed to energize the motor, and the energized motor rotates the gear wheel 20 through the gear train 22. The user holds the back portion of the drive screw and pushes the drive screw lightly forwardly to help mesh the external thread of the drive screw 14 with the internal thread of the gear wheel 20. When the gear wheel 20 and the drive screw 14 have their threads meshed, the rotation of the gear wheel 20 drives the drive screw forwardly while the operator holds the back end of the drive screw to keep it from rotating. The extruder is ready to start extruding when the forward motion of the drive screw 14 moves the square front end 14a into the square opening 16c of the pusher 16. The operator may twist slightly the back end of the drive screw 14 to help align the portions 14a and 16c. For actual extrusion, the operator may hold the switch 28 closed continuously or may close it intermittently, as desired for the particular purpose for which the food substance in the tube 12 is being extruded. Just before the pusher 16 has moved forwardly all the way to the disc 18, the threaded portion of the drive screw 14 runs out of the internal thread of the gear wheel 20. Thus, when all or most of the food substance has been extruded from the tube 12, the drive screw 14 no longer engages the gear wheel 20 and comes off the housing 10 with the sleeve 12 when the sleeve is unscrewed from the housing.

For reloading, the sleeve 12 is unscrewed from the housing 10 and the cap 17 is unscrewed from the tube 12 and the disc 18 removed. The drive screw 14 is taken off and the sleeve 12 may be reloaded either as described above, by first attaching into the housing 10, or by loading it first and then attaching it to the housing. When removed from the housing, the drive screw 14, sleeve 12, pusher 16, extruding disc 18 and cap 17 may be cleaned.

It is desirable that when the extruder is assembled and the pusher 16 is all the way back to its home position against the flange 12c, the square front portion 14a of the drive screw starts entering the square opening 16c of the pusher 16 before the threaded portion 14c engages the internal thread 20a of the drive wheel 20. Otherwise, it may be difficult to align the square cross-sections of 14a and 16c with each other as the drive screw 14 is being driven forward by the motor. It is also important that the square front end 14a not be all the way into the square opening 16c when the threads of the drive screw 14 and the gear wheel 20 start meshing because otherwise it may require too much manual force to push the pusher 16 forward to permit the threads of the drive screw and the gear wheel to start meshing. For these reasons, the combined length of the reduced diameter portions 14a and 14b of the drive screw 14 is such that when the pusher 16 is at its home position and the threaded portion 14c just comes to bear against the internal thread of the gear wheel 20, the front end of the drive screw 14 is intermediate the back end and the front end of the tunnel-like square opening 16c of the pusher 16. Additionally, it is important that the threaded portion 14c of the drive screw run out of the threaded portion of the gear wheel 20 before the free travel of the pusher 16 ends and it comes to bear against the extruding disc 18, so as to prevent overloading the motor. Accordingly, the threaded portion 14c of the drive screw ends before the pusher 16 reaches the end of its free forward travel. Of course, it should be clear that the entire drive screw 14 should be capable of passing through the threaded opening of the gear wheel 20 for the extruder to operate.

The entire extruder is made primarily of inexpensive molded plastic components, and is assembled together with no tools or with simple hand tools. The only non-plastic parts are the batteries 26, springs 28 for spring loading the batteries toward their contacts, the electrical wires connecting the batteries to the points of the switch 28 and to the motor 24, the motor 24 and three screws 30 for attaching a component of the housing 10 to the remainder of the housing. All other parts, including all of the gear train 22, the drive wheel 20 and the drive screw 14, are made of inexpensive molded plastic which makes the extruder inexpensive to make and assemble and easy and efficient to use and clean.

Further details of the extruder are described in a fold-out brochure copyrighted in 1976 by Ronco Teleproducts, Inc., and entitled "The Cookie Machine", which is hereby incorporated by reference.

I claim:

1. A hand-held, battery-operated decorative extruder for dough or another cream- or paste-like food substance for making cookies, food decorations and the like comprising:

a tube having a front end and a back end spaced apart along the tube axis, a pusher closely fitting inside the tube and moveable along the tube axis and a drive screw detachably secured to the pusher and extending back from the pusher along the tube axis, said tube and pusher having cooperating means for substantially preventing relative rotation between them about the tube axis and said drive screw and pusher similarly having cooperating means for substantially preventing relative rotation between them about the tube axis;

a housing and cooperating means at the housing and the tube for detachably securing the back end of the tube to the housing, a gear wheel having an internally threaded central opening and mounted in the housing, coaxially with the tube axis, for rotation about said axis, said housing and back end of the tube having apertures to permit the drive screw to extend therethrough and through the threaded central aperture of the gear wheel, and said drive screw having an externally threaded back portion meshing with the internal thread of the gear wheel and a reduced diameter front portion which passes through the central opening of the gear wheel without engaging the threads thereof, said reduced diameter front portion of the drive screw being longer than the minimum distance between the back end of the gear wheel thread and the pusher, said drive screw having no portion which cannot pass through the internally threaded aperture of the gear wheel, and the distance between the front end of the pusher and the back end of the threaded portion of the drive screw being less than the distance between the maximum forward position of the front end of the pusher and the front end of the internal thread of the gear wheel;

an electrical motor, at least one battery, switch means for energizing the motor by connecting the at least one battery thereto and means connecting the motor to the gear wheel to rotate the gear wheel about the tube axis when the motor is energized so as to move the drive screw forwardly, all mounted in the housing; and means at the front end of the sleeve having a selected extruding aperture;

whereby the pusher is moved back to its minimum distance from the gear wheel, the tube ahead of the pusher is filled with the food substance to be extruded, the front portion of the drive screw is inserted nonrotatably through the internally threaded aperture of the gear wheel and secured detachably to the pusher, the motor is energized to rotate the gear wheel and the drive screw is pushed forwardly to mesh its external thread with the internal thread of the gear wheel, the rotating gear wheel drives the nonrotating drive screw forwardly along the tube axis to move the pusher forwardly and thus extrude the substance through the extruding opening at the front end of the tube, and the gear wheel drives the entire threaded portion of the drive screw forwardly of its internal thread when the pusher is at its maximum forward position so that the tube can be detached from the housing together with the drive screw after the substance filling the sleeve has been so extruded.

2. A hand-held, battery-operated decorative extruder for dough or another cream- or paste-like food substance for making cookies, food decorations and the like comprising:

a tube having a front end and a back end spaced apart along the tube axis, a pusher closely fitting inside the tube and moveable along the tube axis and a drive screw detachably secured to the pusher and extending back from the pusher along the tube axis, said tube and pusher having cooperating means for substantially preventing relative rotation between them about the tube axis and said drive screw and pusher similarly having cooperating means for substantially preventing relative rotation between them about the tube axis;

a housing and cooperating means at the housing and the tube for detachably securing the back end of the tube to the housing, a gear wheel having an internally threaded central opening and mounted in the housing, coaxially with the tube axis, for rotation about said axis, said housing and back end of the tube having apertures to permit the drive screw to extend therethrough and through the threaded central aperture of the gear wheel, and said drive screw having an externally threaded back portion meshing with the internal thread of the gear wheel and a reduced diameter front portion which passes through the central opening of the gear wheel without engaging the threads thereof, said drive screw having no portion which cannot pass through the internally threaded aperture of the gear wheel;

an electrical motor, at least one battery, switch means for energizing the motor by connecting the at least one battery thereto and means connecting the motor to the gear wheel to rotate the gear wheel about the tube axis when the motor is energized so as to move the drive screw forwardly, all mounted in the housing; and means at the front end of the sleeve having a selected extruding aperture;

whereby the pusher is moved back to its minimum distance from the gear wheel, the tube ahead of the pusher is filled with the food substance to be extruded, the front portion of the drive screw is inserted through the internally threaded aperture of the gear wheel and secured detachably to the pusher, the motor is energized to rotate the gear wheel and the rotating gear wheel meshes with and drives the nonrotating drive screw forwardly along the tube axis to move the pusher forwardly and thus extrude the substance through the extending opening at the front end of the tube, and the gear wheel drives the entire threaded portion of the drive screw forwardly out of its internal thread when the pusher is at its maximum forward position so that the tube can be detached from the housing together with the drive screw after the substance in the sleeve has been so extruded.

* * * * *